Dec. 10, 1935.   C. W. VOGT   2,023,629
FROZEN COMESTIBLE PACKAGE
Filed July 1, 1933
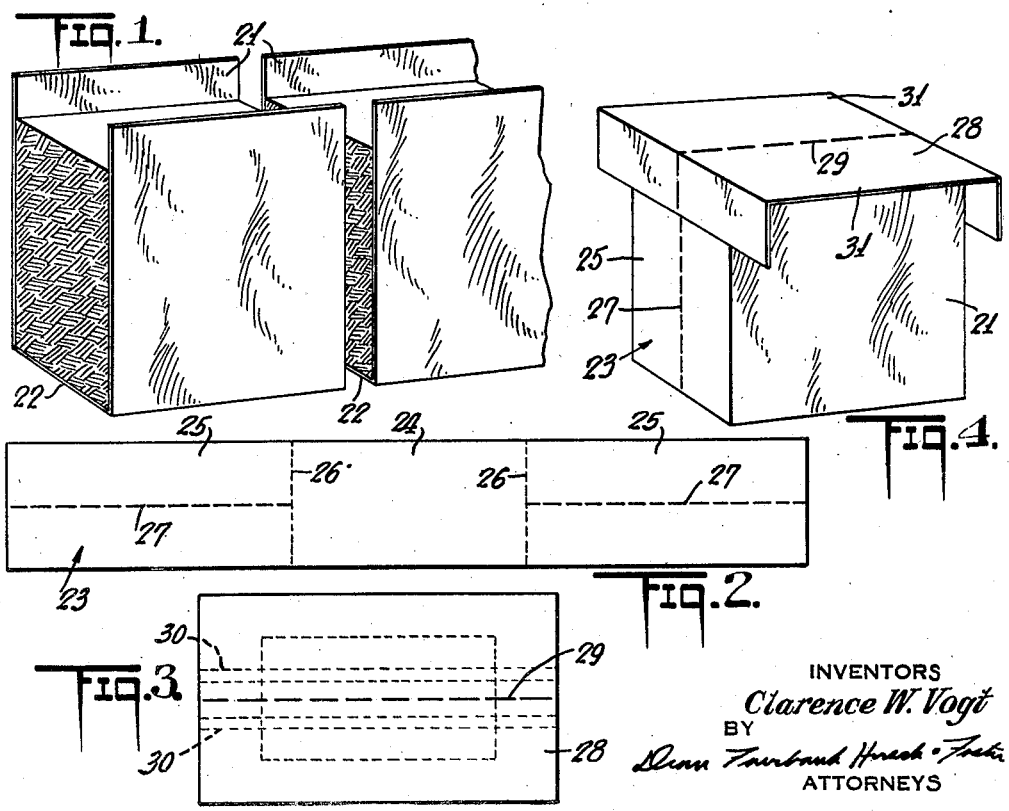
INVENTORS
Clarence W. Vogt
BY
ATTORNEYS Patented Dec. 10, 1935

2,023,629

UNITED STATES PATENT OFFICE 2,023,629

FROZEN COMESTIBLE PACKAGE

Clarence W. Vogt, Louisville, Ky., assignor, by mesne assignments, to Vogt Processes, Incorporated, Louisville, Ky., a corporation of Delaware Application July 1, 1933, Serial No. 678,625

4 Claims. (Cl. 206—56)

In my prior Patent No. 1,906,183, issued April 25, 1933, I have pointed out certain of the difficulties and objections incidental to prior methods of packaging and dispensing ice cream and like frozen comestibles, and have shown and claimed one embodiment of my invention having as its main object to overcome or avoid such difficulties and to provide a package which may be easily and economically formed and which permits the easy and rapid removal of the wrapper and the delivery or depositing of the contents.

The present invention relates to the same general subject matter and has the same objects. More specifically one object of the present invention is to provide a package having a wrapper which is more effectively prevented from opening up during handling, shipment or wide variations in temperature, and which does not require the parts to remain in place due solely to inherent stiffness or adhesion of the block of ice cream or other comestible.

A further object is to provide an enwrapment which will easily break or tear upon pulling the projecting tabs and thus liberate the block of ice cream.

A further object is to provide a simple, inexpensive and easily formed enwrapment which completely encloses the block and which may be easily and quickly removed.

Other objects and advantages will be pointed out hereinafter or will be apparent from a consideration of the forms disclosed in the accompanying drawing.

The continuous production and partial freezing of the ice cream may be accomplished by the use of a continuous freezer which thoroughly incorporates the desired amount of air, continuously delivers the ice cream as a bar or rod which may be cut into sections and after the hardening operation. Mechanisms which may be used for this purpose are shown and claimed in the applications and patents identified in my prior Patent 1,906,183 above referred to.

In the accompanying drawing:

Fig. 1 is a perspective view of a portion of a long bar of ice cream with an individual portion cut from the end thereof.

Figs. 2 and 3 are plan views of other sections of the enwrapment to be used with the portion shown in Fig. 1, and Fig. 4 is a perspective view of the complete package.

In the form shown the bar of ice cream or other comestible is of rectangular rather than cylindrical form, but may be produced in substantially the same way and by a type of mechanism and by a process broadly claimed in my prior Patents 1,810,740 and 1,810,864, issued June 16, 1931. The enwrapment includes a substantially channel shaped strip folded to form side walls 21 and a bottom wall 22. The side walls 21 preferably extend slightly above the upper edge of the bar of ice cream so that they may be folded over as flaps to cover the top of the bar and the top of the sections cut from the bar. After the bar has been hardened and cut into sections as shown at the left of Fig. 1, a second section of the enwrapment is applied. This is in the form of a strip 23 which includes a center portion 24 of a width and length substantially equal to the bottom of the block of ice cream and two end portions 25 each of a length substantially equal to the height of the block. The three portions may be separated by weakened or scored lines 26 to facilitate the folding of the strip to substantially U-shape. The portion 24 is placed beneath the bottom wall 22 of the first enwrapment strip, while the end portions 25 are folded up to cover the surfaces of the ice cream block which were formed by the cutting of the bar into blocks. The end portions 25 each have a weakened line extending lengthwise thereof intermediate of the side edges and preferably formed by a series of slits 27 with short intervening uncut portions between the ends of successive slits. The third section of the enwrapment includes a strip 28 shown in Fig. 3 and having a weakened or slit line 29 extending lengthwise thereof intermediate of the side edges and two bands of glue or adhesive 30 upon opposite sides of and spaced from the slit line 29. This strip 28 is preferably of aproximately the shape, size and proportions in respect to the ice cream block as indicated in Fig. 3, the top of the ice cream block being indicated in dotted lines. This strip is placed on top of the block and the ends folded down as shown in Fig. 4 so that the center portion of the strip is glued to the flaps formed by folding down the upper edges of the walls 21 while the end portions are glued to the upper parts of the portions 25 on opposite sides of the slit line 27.

The strip 28 is preferably made of very much thinner paper than are the other two strips and not only acts to hold the other two strips together and in proper assembled relationship to the block of ice cream, but also presents oppositely extending tabs or flaps 31 which may be grasped and pulled in opposite directions to remove the enwrapment and deliver or deposit the block of ice cream. Upon pulling on these tabs 31 the strip 28 will break along the line 29 and as the strip is glued to both the upper edges of the walls 21 and the upper ends of the portions 25, the walls 21 will be pulled apart and the portions 25 will be torn or broken lengthwise along the slit lines 27 to entirely remove the enwrapment as a single piece.

In the manufacture of the package shown in Fig. 4 the ice cream is hardened in the first section of the enwrapment and after being hardened and cut into blocks the strips 23 and 28 may be rapidly and easily applied thereto by hand or by automatic machinery of the desired character.

The package shown in Fig. 4 has the advantage in that the entire block of ice cream is covered by the enwrapment, but it necessitates the application of an enwrapment formed of a larger number of pieces and a larger number of operations in the forming of the complete package. The strip shown in Fig. 2 may be formed of thin material and may be of greater length than shown so that its end portions will fold over on top of and be adhesively secured to the turned down upper edges of the walls 21 and these end portions may be of greater width so as to present the desired pulling tabs. Thus the function of the strips 23 and 28 shown in Figs. 2 and 3 may be combined in a single strip, although this involves covering the two surfaces of the block of ice cream with the thinner sheet material, whereas in Fig. 4 the entire block is covered with the thicker sheet material. The strip 28 may, if desired, be of the same thickness of material as the other strips, although I prefer to use the thinner material.

During shipment or storage the tabs 31 may be folded down across the side walls 21, but as they are not directly secured to the body portions of said walls they may be readily lifted up and grasped to open the package.

Other forms may be designed within the scope of the appended claims and without departing from the spirit of my invention.

Having thus described my invention, what I claim as new and desire to secure by Letters Patent is:

1. As a new article of manufacture, a package including a substantially solid, substantially rectangular body of edible material, and a paper wrapper formed of three sections, one of said sections being substantially U-shaped and covering three surfaces of said body, another of said sections being substantially U-shaped and covering one of said first mentioned surfaces and two additional surfaces, the leg portions of said last mentioned section having weakened lines lengthwise thereof, and a third section secured to the free ends of both of said first mentioned sections, and having its opposite edges forming tabs adapted to be pulled apart, and having a weakened line intermediate of said edges.

2. As a new article of manufacture, a package including a substantially solid, substantially rectangular body of edible material, and a paper wrapper formed of three sections, one of said sections being substantially U-shaped and covering three surfaces of said body, another of said sections being substantially U-shaped and covering one of said first mentioned surfaces and two additional surfaces, the leg portions of said last mentioned section having weakened lines lengthwise thereof, and a third section secured to the free ends of said second mentioned section, and having its opposite edges forming tabs adapted to be pulled apart, and having a weakened line intermediate of said edges.

3. As a new article of manufacture, a package including a substantially solid, substantially rectangular body of edible material, and a paper wrapper formed of a plurality of sections, one of said sections being substantially U-shaped and covering three surfaces of said body, and another of said sections being substantially U-shaped and having the leg portions thereof provided with longitudinally extending weakened lines adapted to be broken upon pulling apart the leg portions of the first mentioned section.

4. As a new article of manufacture, a package including a substantially solid, substantially rectangulalr body of edible material, and a paper wrapper formed of a plurality of sections, one of said sections being substantially U-shaped and covering three surfaces of said body, and another of said sections being substantially U-shaped and having its leg portions covering two additional surfaces of said body, said leg portions having weakened lines extending lengthwise thereof, and tab portions adapted to be pulled in opposite directions to break said weakened lines and remove said wrapper.

CLARENCE W. VOGT.